(12) United States Patent
Hinchliffe et al.

(10) Patent No.: US 11,831,654 B2
(45) Date of Patent: Nov. 28, 2023

(54) SECURE OVER-THE-AIR UPDATES

(71) Applicant: McAfee, LLC, San Jose, CA (US)

(72) Inventors: Alexander J. Hinchliffe, San Jose, CA (US); Pablo R. Passera, San Jose, CA (US)

(73) Assignee: McAfee, LLC, San Jose, CA (US)

( * ) Notice: Subject to any disclaimer, the term of this patent is extended or adjusted under 35 U.S.C. 154(b) by 488 days.

(21) Appl. No.: 14/978,143

(22) Filed: Dec. 22, 2015

(65) Prior Publication Data

US 2017/0180391 A1 Jun. 22, 2017

(51) Int. Cl.
| | |
|---|---|
| *H04L 9/40* | (2022.01) |
| *H04W 12/033* | (2021.01) |
| *G06F 8/65* | (2018.01) |
| *H04L 67/00* | (2022.01) |
| *H04L 69/22* | (2022.01) |
| *H04W 12/08* | (2021.01) |
| *H04W 12/10* | (2021.01) |

(52) U.S. Cl.
CPC .............. *H04L 63/123* (2013.01); *G06F 8/65* (2013.01); *H04L 63/0435* (2013.01); *H04L 63/08* (2013.01); *H04L 63/1441* (2013.01); *H04L 67/34* (2013.01); *H04L 69/22* (2013.01); *H04W 12/033* (2021.01); *H04W 12/08* (2013.01); *H04W 12/10* (2013.01); *H04L 63/18* (2013.01)

(58) Field of Classification Search
CPC ... H04L 63/123; H04L 63/0435; H04L 67/34; H04L 69/22; G06F 8/65; H04W 12/08
See application file for complete search history.

(56) References Cited

U.S. PATENT DOCUMENTS

| | | | |
|---|---|---|---|
| 5,268,962 A * | 12/1993 | Abadi | ................. H04L 63/1441 380/284 |
| 5,987,610 A | 11/1999 | Franczek et al. | |
| 6,073,142 A | 6/2000 | Geiger et al. | |
| 6,460,050 B1 | 10/2002 | Pace et al. | |
| 6,803,862 B2 * | 10/2004 | O'Connor | .............. G08G 1/123 340/989 |
| 7,506,155 B1 | 3/2009 | Stewart et al. | |

(Continued)

FOREIGN PATENT DOCUMENTS

WO 2017112152 A1 6/2017

OTHER PUBLICATIONS

Ekberg ("Trusted Execution Environments on Mobile Devices," 2013, pp. 1-112).*

(Continued)

*Primary Examiner* — Luu T Pham
*Assistant Examiner* — James J Wilcox
(74) *Attorney, Agent, or Firm* — Patent Capital Group

(57) ABSTRACT

In an example, there is disclosed a computing apparatus having: a network interface to communicate with a second device; a contextual data interface to receive and store contextual data; and one or more logic elements comprising a contextual security agent, operable to: receive a contextual data packet via the network interface; compare the contextual data packet to stored contextual data; and act on the comparing. The contextual data packet may optionally be provided out of band, and may be used to authenticate a substantive data packet, such as a patch or update.

24 Claims, 7 Drawing Sheets

(56) References Cited

U.S. PATENT DOCUMENTS

| | | | | |
|---|---|---|---|---|
| 8,296,562 | B2* | 10/2012 | Williams | H04L 63/0838 |
| | | | | 713/155 |
| 8,966,621 | B1* | 2/2015 | Johansson | H04L 63/1425 |
| | | | | 726/22 |
| 9,086,941 | B1* | 7/2015 | Siegel | H04L 67/55 |
| 9,183,393 | B2* | 11/2015 | Djabarov | H04L 41/082 |
| 9,268,555 | B2* | 2/2016 | Djabarov | G06F 9/44 |
| 9,425,627 | B2* | 8/2016 | Proud | H02J 50/12 |
| 9,672,508 | B2* | 6/2017 | Aabye | G06Q 20/10 |
| 9,742,790 | B2* | 8/2017 | Sood | H04L 63/1425 |
| 9,753,796 | B2* | 9/2017 | Mahaffey | G06F 11/0766 |
| 9,904,535 | B2* | 2/2018 | Gross | G01R 31/44 |
| 9,990,781 | B2* | 6/2018 | Haidar | G07C 5/006 |
| 2003/0147534 | A1 | 8/2003 | Ablay et al. | |
| 2004/0019876 | A1* | 1/2004 | Dravida | H04L 12/2801 |
| | | | | 717/117 |
| 2005/0039178 | A1* | 2/2005 | Marolia | H04W 8/245 |
| | | | | 717/168 |
| 2005/0060070 | A1* | 3/2005 | Kapolka | G07C 5/008 |
| | | | | 701/31.4 |
| 2006/0041755 | A1* | 2/2006 | Pemmaraju | H04L 63/083 |
| | | | | 713/182 |
| 2006/0206698 | A1* | 9/2006 | Foucher | G06F 21/577 |
| | | | | 713/1 |
| 2007/0172063 | A1* | 7/2007 | Biggs | H04L 51/04 |
| | | | | 380/255 |
| 2008/0043716 | A1* | 2/2008 | Toombs | H04L 45/00 |
| | | | | 370/351 |
| 2009/0119657 | A1 | 5/2009 | Link | |
| 2010/0306533 | A1* | 12/2010 | Phatak | G06F 21/30 |
| | | | | 713/156 |
| 2011/0167250 | A1* | 7/2011 | Dicks | A61B 5/1112 |
| | | | | 713/2 |
| 2011/0173457 | A1* | 7/2011 | Reh | G06F 21/572 |
| | | | | 713/191 |
| 2011/0234427 | A1* | 9/2011 | Ingram | G06F 16/248 |
| | | | | 340/995.1 |
| 2011/0320089 | A1 | 12/2011 | Lewis | |
| 2012/0066759 | A1* | 3/2012 | Chen | G06F 21/554 |
| | | | | 726/15 |
| 2012/0159603 | A1* | 6/2012 | Queck | H04L 9/3215 |
| | | | | 726/9 |
| 2013/0103651 | A1* | 4/2013 | Jha | G06F 17/30097 |
| | | | | 707/687 |
| 2013/0304281 | A1* | 11/2013 | Burcham | G06F 21/10 |
| | | | | 701/2 |
| 2013/0318357 | A1* | 11/2013 | Abraham | G06F 21/57 |
| | | | | 713/176 |
| 2013/0347089 | A1* | 12/2013 | Bailey | H04L 9/3215 |
| | | | | 726/7 |
| 2014/0108789 | A1* | 4/2014 | Phatak | H04L 9/3263 |
| | | | | 713/156 |
| 2014/0109203 | A1* | 4/2014 | Pemmaraju | H04L 63/0861 |
| | | | | 726/5 |
| 2014/0223175 | A1* | 8/2014 | Bhatnagar | H04W 12/0609 |
| | | | | 713/159 |
| 2014/0310702 | A1* | 10/2014 | Ricci | H04L 67/12 |
| | | | | 717/173 |
| 2014/0317614 | A1* | 10/2014 | Djabarov | G06F 8/654 |
| | | | | 717/173 |
| 2014/0324275 | A1* | 10/2014 | Stanek | G07C 5/0816 |
| | | | | 701/31.4 |
| 2014/0337957 | A1* | 11/2014 | Feekes | H04L 63/0861 |
| | | | | 726/9 |
| 2015/0040117 | A1* | 2/2015 | Fitzgerald, II | G06F 9/45533 |
| | | | | 717/172 |
| 2015/0105046 | A1* | 4/2015 | Grosby | H04L 63/18 |
| | | | | 455/411 |
| 2015/0121457 | A1* | 4/2015 | Schwarz | G06F 3/0484 |
| | | | | 726/3 |
| 2015/0161913 | A1* | 6/2015 | Dominguez | G09B 19/167 |
| | | | | 434/65 |
| 2015/0189581 | A1* | 7/2015 | Katar | H04L 9/3263 |
| | | | | 714/748 |
| 2015/0242198 | A1* | 8/2015 | Tobolski | G06F 8/61 |
| | | | | 717/172 |
| 2015/0337587 | A1* | 11/2015 | Lu | E05F 15/70 |
| | | | | 701/49 |
| 2015/0378382 | A1* | 12/2015 | Phatak | G06F 21/30 |
| | | | | 700/295 |
| 2016/0013934 | A1* | 1/2016 | Smereka | G06F 21/572 |
| | | | | 713/171 |
| 2016/0057122 | A1* | 2/2016 | van Bergeijk | H04W 12/06 |
| | | | | 713/168 |
| 2016/0070932 | A1* | 3/2016 | Zimmer | G06F 21/53 |
| | | | | 713/192 |
| 2016/0086391 | A1* | 3/2016 | Ricci | G06Q 10/10 |
| | | | | 701/29.3 |
| 2016/0098915 | A1* | 4/2016 | Phatak | H04L 9/3263 |
| | | | | 340/538 |
| 2016/0250490 | A1* | 9/2016 | Hoffman | A61N 1/37252 |
| | | | | 607/60 |
| 2016/0286393 | A1* | 9/2016 | Rasheed | H04L 9/3215 |
| 2016/0314315 | A1* | 10/2016 | Krogius | G06F 21/577 |
| 2016/0366180 | A1* | 12/2016 | Smith | H04L 63/20 |
| 2016/0366247 | A1* | 12/2016 | Lewis | G01C 21/32 |
| 2017/0024201 | A1* | 1/2017 | Diedrich | G06F 8/65 |
| 2017/0094377 | A1* | 3/2017 | Herdrich | H04L 41/5009 |
| 2018/0063244 | A1* | 3/2018 | Maturana | G06F 9/5072 |

OTHER PUBLICATIONS

Technopedia ("Cache Memory," Jul. 3, 2014, p. 1, retrieved from https://web.archive.org/web/20140703035848/https://www.techopedia.com/definition/6307/cache-memory.*

Jendrock ("The Java EE 7 Tutorial," vol. 2, Fifth Edition, May 2014, p. 248).*

Mayer et al "Conversations with Connected Vehicles," 2015 5th International Conference on Internet of Things (IoT), pp. 38-44 (Year: 2015).*

Bajpai et al "Design and Prototype Implementation of the WattsApp Telemetry Platform," 2012 IEEE International Conference on Green Computing and Communications, Conference on Internet of Things, and Conference on Cyber, Physical and Social Computing, IEEE Computer Society, pp. 72-78 (Year: 2012).*

International Search Report and Written Opinion issued in PCT Application No. PCT/US2016/062380 dated Feb. 20, 2017; 12 pages.

* cited by examiner

SECURE OVER-THE-AIR UPDATES

FIELD OF THE SPECIFICATION

This disclosure relates in general to the field of network security, and more particularly, though not exclusively to, a system and method for secure over-the-air updates.

BACKGROUND

Computers often need to update, either to install new features and capabilities, or to keep up with the latest security patches and virus definitions. In some cases, updates are retrieved from a remote third-party location, or from an enterprise server. The updates may be "pushed" out by the server, or "pulled down" by the client. Once an update has been retrieved, the client may apply the update, replacing some existing software with new software.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
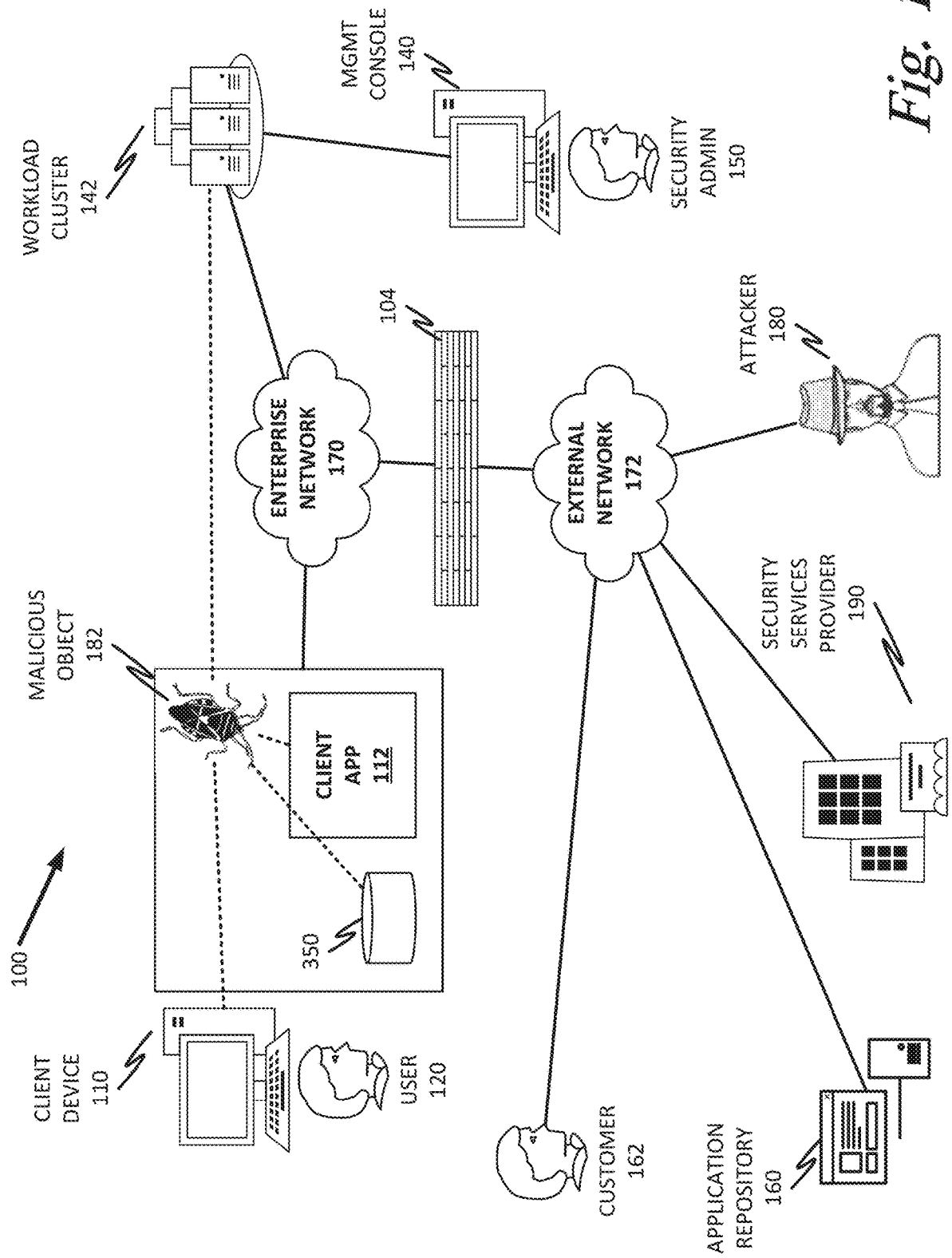
FIG. 1 is a block diagram of a security-enabled network according to one or more examples of the present specification.

In an example, there is disclosed a computing apparatus having: a network interface to communicate with a second device; a contextual data interface to receive and store contextual data; and one or more logic elements comprising a contextual security agent, operable to: receive a contextual data packet via the network interface; compare the contextual data packet to stored contextual data; and act on the comparing. The contextual data packet may optionally be provided out of band, and may be used to authenticate a substantive data packet, such as a patch or update.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In the Internet of Things (IoT) age, devices communicate increasingly over the air (OTA). While wireless communications are convenient and flexible, they may be less secure than wired communications because they can be compromised by any actor who is able to read a signal. This can be particularly problematic for a "man-in-the-middle" (MITM) attack, in which a malicious actor intercepts an update before it reaches its intended recipient. The MITM may then modify the packet with a malicious payload.

Thus, OTA update packages, including software OTA (SOTA) and firmware OTA (FOTA) could be compromised by an attacker between the time an update is available online (at the manufacturer's website or backend) and the time it is deployed on the target device. One method may include intercepting between the source of the update and the destination, when the update is in transit and more vulnerable to tampering. If an attacker intercepts an OTA update package, he may insert a malicious payload. Depending on the nature of the target device, such a payload may have significant operational and/or privacy implications. Furthermore, if the device itself is a trusted device on a network, it may be able to propagate the malicious payload to other devices.

Using a modern, internet-connected "smart car" as an illustrative example of an IoT device that could receive such updates, the risks from attack could be plentiful. Tampering with the OTA package could result in a failed update, preventing an existing problem from being fixed. Data corruption could also lead to unpredictable post-update operational states, which could be very dangerous in a car that has the ability to cause harm if improperly controlled. The attacker could also have overtly malicious intent. For example, he may sabotage the car so that it cannot lock (making it vulnerable to burglary) or cannot unlock (trapping the driver inside). In another example, the attacker could cause the doors open during travel, possibly harming a passenger or other cars, or cause the car to swerve off the road and deliberately strike a pedestrian. While a car is used here as an illustrative and nonlimiting example, many other wireless devices could be vulnerable to such attacks, with damage ranging from lost data, lost privacy, or serious financial damage. It should also be noted that even wired connections, though somewhat less vulnerable than wireless connections, can also be compromised. Thus, the teachings of this specification need not necessarily be limited to OTA updates for IoT devices. In suitable cases, even a desktop PC connected to an enterprise Ethernet connection may benefit from the teachings herein.

Returning to the illustrative example of an IoT device receiving remote, OTA updates, the device manufacturer may receive and store information (often anonymized) about each device, including for example information about the device owners, device locations, time and date of events, device usage, battery levels and degradation, and device actuarial data by way of non-limiting example. Collection of such information is part of the "big data" trend, in which large data sets are collected to enable interested parties to track trends and make decisions about topics such as manufacturing, advertising, and safety. In some cases, some or all of these data may be masked or anonymized. For example, rather than sending a clear text identifier of a user, the value may be hashed. This means that data from the same user can be correlated, without specifically identifying the user himself.

Continuing with internet-connected car example, the manufacturer may store contextual data, such as the locations of their car over time, engine and battery usage and degradation, charge levels (especially in fully-electric cars), service intervals and so on. These may be stored in a telemetry data cache, and in some cases, specific data sets may be correlated to a specific device.

Some or all of the data may also be mirrored on the device itself, in a local telemetry cache. Thus, because both the source and destination components of the aforementioned OTA update package have a copy of these telemetry data, a particular value may be selected and used as a key for the devices to authenticate themselves to one another, effectively playing the role of a "secret" or "thing known" in an authentication scheme. This may be combined with other multi-factor authentication schemes (for example, a security token may also be required, or an attestation protocol between trusted execution environments (TEEs) may be used). The tokens may be exchanged in any suitable format, including via clear test, or hashed values may be exchanged so that it is harder for an attacker to intercept useful data. Hashing may also help to preserve user anonymity. In various examples, the telemetry data may be referred to as a "contextual packet," which is used for authentication. A "substantive packet" may also be provided, with the actual payload to be delivered to the client device. The substantive packet may be provided either in-band (over the same channel as the substantive packet, in which case the contextual packet may be embedded with the substantive packet) or out-of-band (over a different channel from the substantive channel, for example, the substantive packet is provided via WiFi, while the contextual packet is provided over a cellular network). In an example, the contextual packet may even be used as an encryption key. For example, the server may encrypt the substantive packet with a particular telemetry datum, and may provide the encrypted packet along with an index that tells the client which datum to use as the decryption key.

To create and verify authenticity, random selections of telemetry or other contextual data may be made for a given device in the manufacturer's cloud to provide a contextual signature of the platform, that is, the device, the user and the habits of both.

Once the client device receives the update, it will only apply the update once the contextual package has been verified. This could be done through checking each of several randomly selected data points against the local telemetry cache. For example, this could include that at a given date and time the device was charged for a certain number of hours, that the battery level was at a certain percentage, that the device was at a certain location, and so on.

In one illustrative example, a client device makes an update request to the manufacturer via the internet. The manufacturer prepares an update package and randomly selects contextual information from its database. The manufacturer may encrypt or hash the contextual information. The network packet may be wrapped in a typical network packet header or footer, or may be used to encrypt the OTA update itself. The encrypted contextual information may be used for integrity and security checks.

When the client device receives the update, it decrypts the contextual packet and compares it to data in its local telemetry cache. The update is applied only if the contextual packet is found to be a match.

A system and method for providing secure over-the-air updates will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a secured enterprise 100 according to one or more examples of the present specification. In this example, secured enterprise 100 may be configured to provide services or data to one or more customers 162, who may access information or services via external network 172. This may require secured enterprise 100 to at least partly expose certain services and networks to the outside world, thus creating a logical security aperture.

Within secured enterprise, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs.

It should also be noted that some functionality of endpoint devices 110 may also be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 110 could be a "thin client" such as a Google Chromebook, running only a stripped-down operating system, and still provide user 120 useful access to enterprise resources.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In other case, management console 140 may be provided as a web interface, on a desktop-class machine, or via a VM provisioned within workload cluster 142.

Secured enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Secured enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172. A security services provider 190 may provide services to secured enterprise 100.

It may be a goal of users 120 and secure enterprise 100 to successfully operate client devices 110 and workload cluster 142 without interference from attacker 180 or from unwanted security objects. In one example, attacker 180 is a malware author whose goal or purpose is to cause malicious harm or mischief, for example by injecting malicious object 182 into client device 110. Once malicious object 182 gains access to client device 110, it may try to perform work such as social engineering of user 120, a hardware-based attack on client device 110, modifying storage 350 (FIG. 3), modifying client application 112 (which may be running in memory), or gaining access to enterprise servers 142.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious himself, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Application repository 160 may represent a Windows or Apple "App Store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 110.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

When a new object is first encountered on the network, security policies may initially treat it as "gray" or "suspect." As a first line of defense, a security appliance in cluster 142 may query security services provider 190 to see if the new object has a globally-recognized reputation. If so, a local reputation may be generated based on that global reputation. If not, the object is completely new and may be treated as a "candidate malicious object," meaning that its status is unknown, and it may therefore be a malicious object. At a minimum, the new object may be proscribed in its access to protected resources until its reputation can be established. This may include validating the new object via contextual data according to the methods disclosed herein.

The candidate malicious object may also be subjected to additional rigorous security analysis, particularly if it is a new object with no global reputation, or if it is an executable object. This may include, for example, submitting the object to an internal security audit, or to security services provider 190, for deep analysis. This may include running the object in a sandbox environment, expert status analysis, or other security techniques. These may help to establish a new reputation for the object.

If the object is permitted to operate on the network and malicious behavior is observed, the object may be tagged as malicious object 182. Remedial action may then be taken as appropriate or necessary. Thus, it is a goal of users 120 and security administrator 150 to configure and operate client devices 110, workload cluster 142, and enterprise network 170 so as to exclude all malicious objects, and to promptly and accurately classify candidate malicious objects.

In certain embodiments, client device 110 may be a device that collects telemetry or other contextual data, as described herein. For example, client device 110 may be an internet of things (IoT) device, and may periodically collect data about its environment, and may report telemetry data to workload cluster 142, or may upload the data to the cloud. As described herein, these contextual data may be used to authenticate an external device with access to a contextual data cache. This may include a server within workload cluster 142, or an update service provided by a third party. This is illustrated in more detail in FIG. 5.

Figure 2:
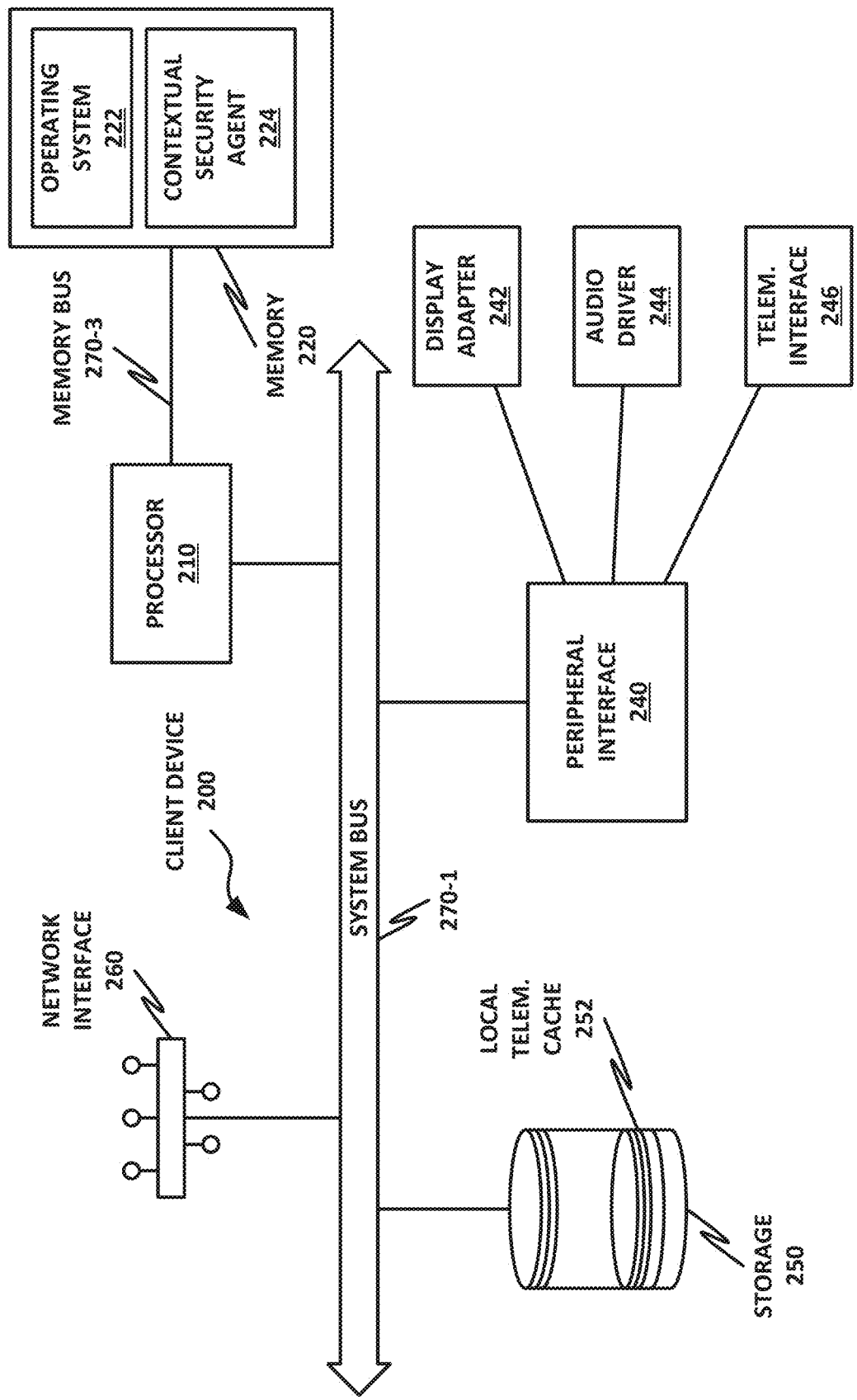
FIG. 2 is a block diagram of a computing device according to one or more examples of the present specification.

FIG. 2 is a block diagram of client device 200 according to one or more examples of the present specification. Client device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110 may be an example of client device 200.

Client device 200 includes a processor 210 connected to a memory 220, having stored therein executable instructions for providing an operating system 222 and at least software portions of a contextual security agent 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of contextual security agent 224. Many other configurations are also possible, and are intended to be encompassed within the broad scope of this specification.

Figure 3:
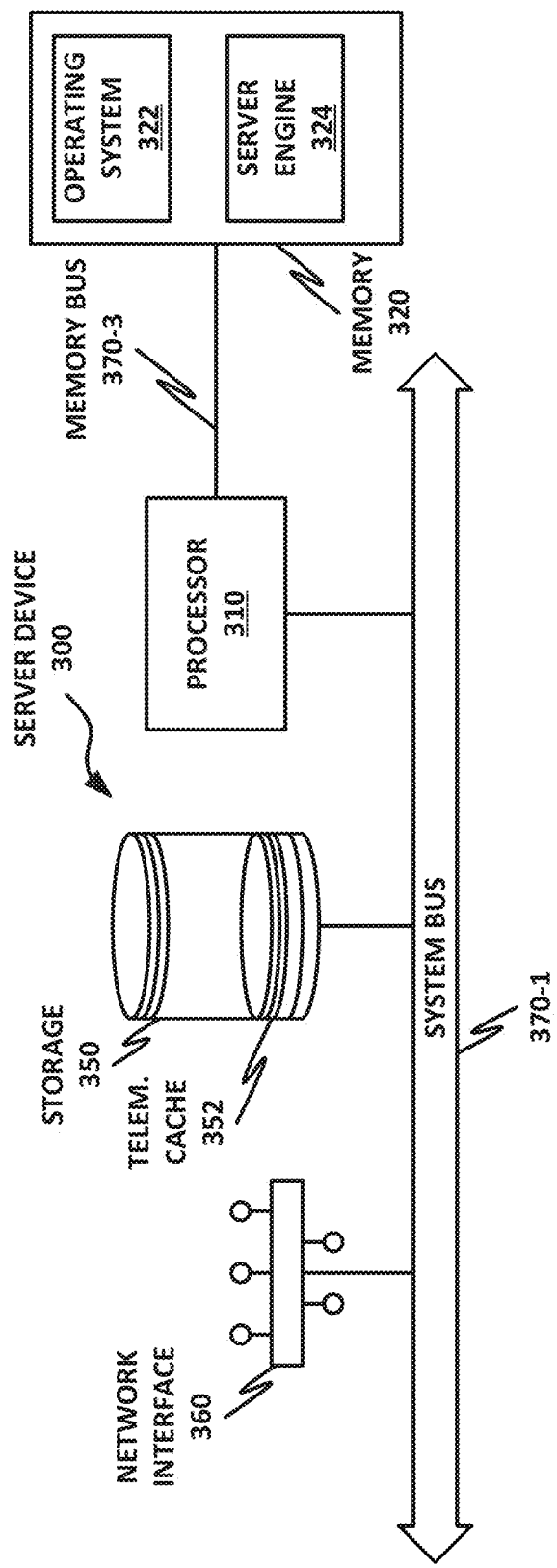
FIG. 3 is a block diagram of a server according to one or more examples of the present specification.

Storage 250 may have stored therein a local telemetry cache 252. Local telemetry cache may be a storage for data received via telemetry interface 246, which may be stored in any suitable format. Local telemetry cache 252 may ensure that it stores data in a format similar or identical to a format used by server 300 (FIG. 3) and telemetry cache 352 (FIG. 3). This ensures that telemetry values match and can be successfully used for authentication. In an example, contextual security agent 224 periodically polls telemetry interface 246, or telemetry interface 246 "pushes" out a new telemetry value, such as via an interrupt or other suitable method. Contextual security agent 224 may store all telemetry values in local telemetry cache 252, or may selectively store only some values. Values stored in local telemetry cache 252 may be uploaded to the cloud, for server 300 to store in telemetry cache 352.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Contextual security agent 224, in one example, is operable to carry out computer-implemented methods as described in this specification. Contextual security agent 224 may include one or more tangible non-transitory computer-readable mediums having stored thereon executable instructions operable to instruct a processor to provide a contextual security agent 224. As used throughout this specification, an "engine" includes any combination of one or more logic elements, of similar or dissimilar species, operable for and configured to perform one or more methods provided by the engine. Thus, contextual security agent 224 may comprise one or more logic elements configured to provide methods as disclosed in this specification. In some cases, contextual security agent 224 may include a special integrated circuit designed to carry out a method or a part thereof, and may also include software instructions operable to instruct a processor to perform the method. In some cases, contextual security agent 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that contextual security agent 224 may also include other hardware and software, including configuration files, registry entries, and interactive or user-mode software by way of non-limiting example.

In one example, contextual security agent 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of contextual security agent 224 to provide the desired method.

Figure 7:
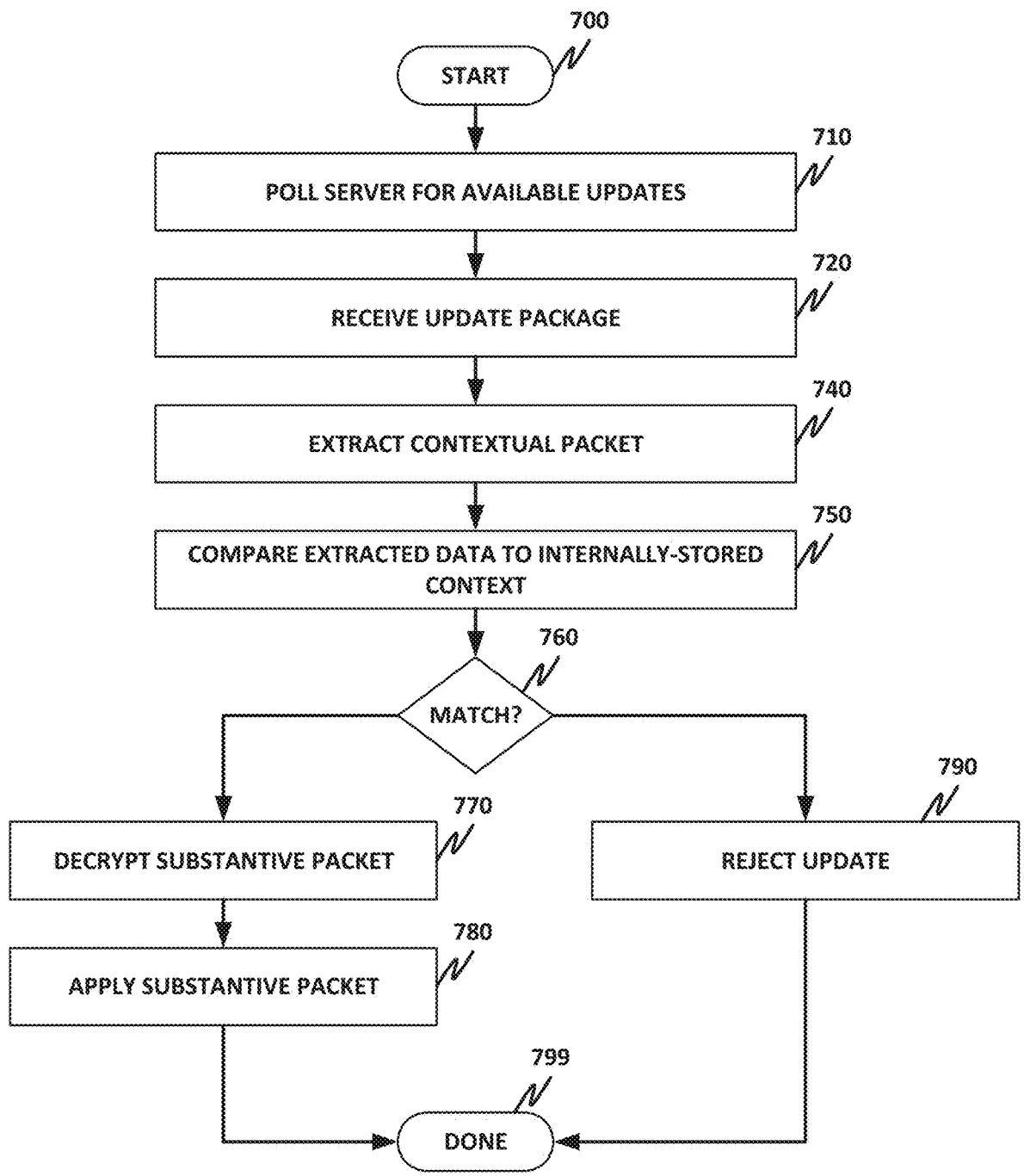
FIG. 7 is a flow chart of a method performed by a server engine according to one or more examples of the present specification.

In a particular example, contextual security agent 224 may be configured to provide method 700 of FIG. 7, or a similar method as described herein. For example, when contextual security agent 224 receives a substantive packet (i.e., a packet to be applied to client device 200, such as a patch, update, or any other suitable object with a substantive payload), contextual security agent 224 may also look for any accompanying contextual data packet, which may be received either in-band or out-of-band. Contextual security agent 224 may not apply the substantive packet unless the contextual security packet is successfully authenticated. Contextual security agent 700 may also collect and log or cache contextual data that may be useful for authentication.

A trusted execution framework (TEF) 226 may also be provided. TEF 226 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of TEF 226 to provide the desired method.

Figure 4:
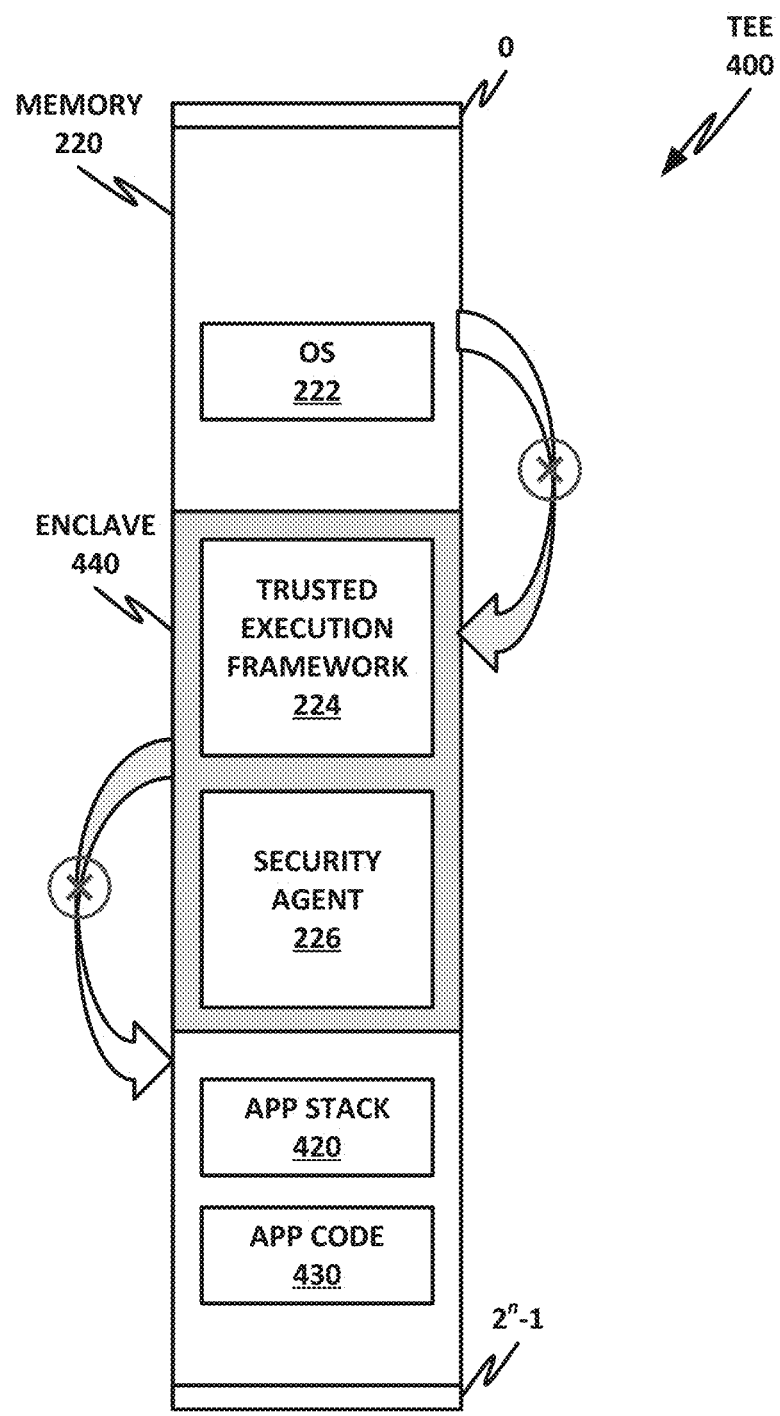
FIG. 4 is a block diagram of a trusted execution environment (TEE) according to one or more examples of the present specification.

Conceptually, TEF 226 may provide an application programming interface (API), and supporting software, that simplifies a programmer's use of TEE 400 (FIG. 4).

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and telemetry interface 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Telemetry interface 246 may be to receive telemetry data or any other suitable contextual data, which may be used for contextual authentication. The type of contextual data collected may be very specific to the type of system being operated. For example, if client device 200 is a computer for a smart car or other vehicle, contextual data may include information about the driver, information about passengers, location information received from a GPS, speed or direction, interior temperature, exterior temperature, reported weather conditions (such as provided by an on-board weather station, or as reported by a weather service), or any other suitable contextual data.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a server engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324.

Network interface 360 may be provided to communicatively couple server 140 to a wired or wireless network, and may include one or more logic elements as described in FIG. 2.

Server engine 324 is an engine as described in FIG. 2 and, in one example, includes one or more logic elements operable to carry out computer-implemented methods as described in this specification. Software portions of server engine 324 may run as a daemon process.

Server engine 324 may include one or more non-transitory computer-readable mediums having stored thereon executable instructions operable to instruct a processor to provide a security engine. At an appropriate time, such as upon booting server 140 or upon a command from operating system 322 or a user 120 or security administrator 150, processor 310 may retrieve a copy of server engine 324 (or software portions thereof) from storage 350 and load it into memory 320. Processor 310 may then iteratively execute the instructions of server engine 324 to provide the desired method.

Figure 6:
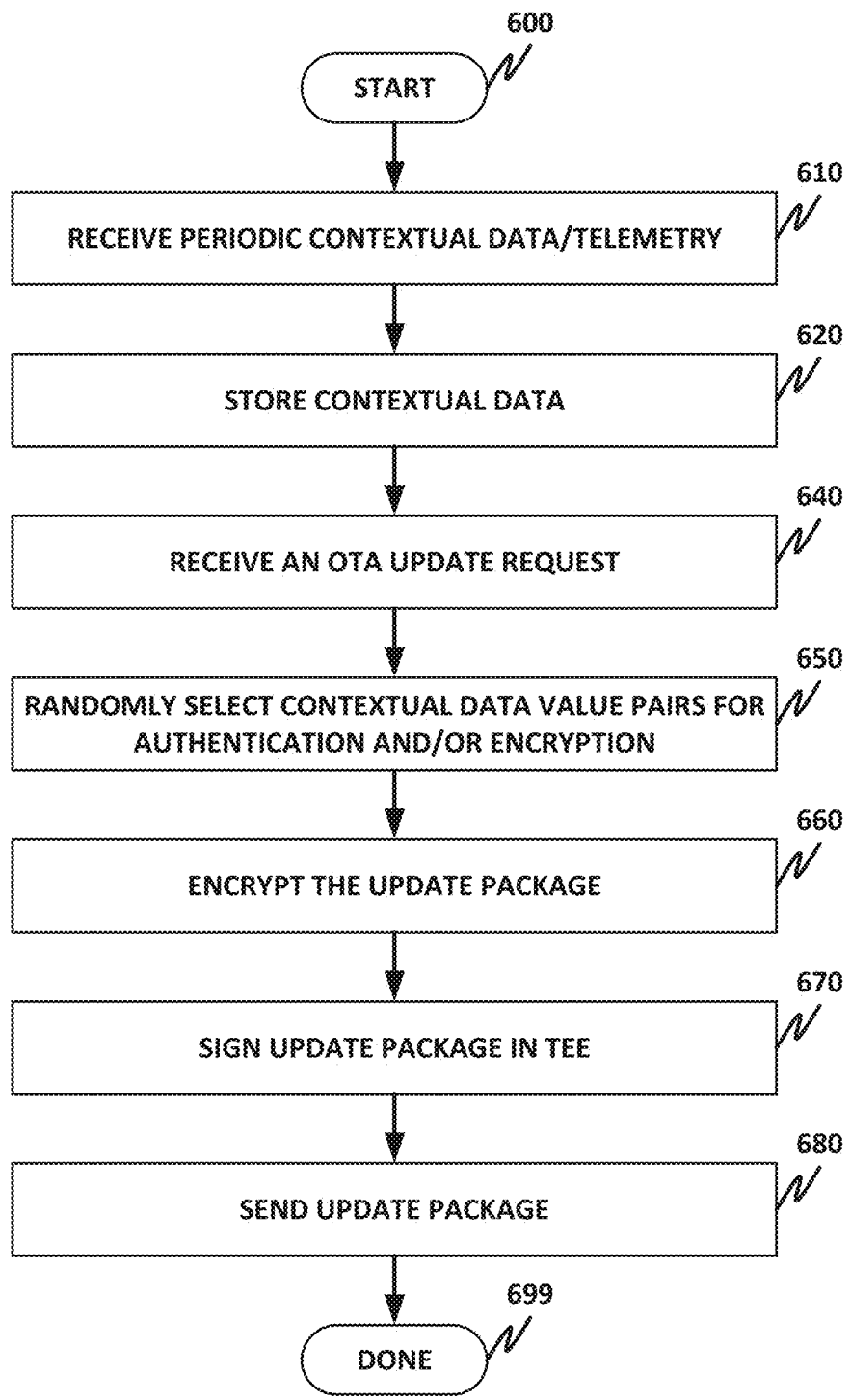
FIG. 6 is a flow chart of a method performed by a client engine according to one or more examples of the present specification.

Server engine 324 may be configured to perform method 600 of FIG. 6, or other suitable methods according to this specification. This may include receiving contextual data reports or logs from client device 200, and storing appropriate data (which may include all or part of the data received) in telemetry cache 352 of storage 350. These cached telemetry values may later be used to authenticate server 300 to client 200 when a substantive packet is needed, such as an update or a patch.

Note that telemetry cache 352 is disclosed as part of a single server 300 with server engine 324 by way of illustrative example, but this configuration is not required. In some cases, telemetry cache 352 may be maintained on a separate cloud server, or by a third party, and values may be provided to server engine 324 only when server engine 324 needs to authenticate itself to client 200. In that case, a strong authentication may be required by server engine 324 so that the cloud service knows that this is a legitimate service. In another example, server engine 324 may not have any visibility into the contextual data. For example, telemetry cache 352 may be maintained by a third party such as a software vendor that also stores telemetry data. The telemetry data along with the substantive packet may be provided to server 300, which may be a service broker that simply makes contact with client 200 and passes along the packet. In yet another example, server engine 324 may be pre-authenticated to telemetry cache 352, and telemetry cache 352 may periodically push out a telemetry value that can be used for authorization. It should be recognized that many other configurations and combinations are possible, and this specification is intended to broadly encompass any appropriate configuration.

FIG. 4 is a block diagram of a trusted execution environment (TEE) 400 according to one or more examples of the present specification. TEE 400 may be used to further authenticate or verify transactions between a client 200 and a server 300. For example, when a server 300 pushes out an update to a client 200, that update may be signed with a key uniquely identifying a TEE of server 300. An attestation protocol may then be used by which client 200 can verify that server 300 is authentic. It should also be noted that while this specification uses a server-to-client authentication as an illustrative example, it may also be necessary for client 200 to authenticate itself to server 300. In that case, identical methods may be used, with the client and server switching roles. In that case, a key signed by TEE 400 of client 200 may be used to authenticate to server 300.

TEE 400 need not supplant the security of contextual authentication, but rather may supplement it. For example, an attestation protocol may help client 200 to ensure that the contextual payload has not been tampered with in the interim. This may prevent "man in the middle" (MITM) attacks, where a packet is intercepted and changed. It may also enable client 200 to verify that the update packet is coming from a genuine server 300, and not from some other device that has managed to intercept or infer some piece of telemetry and is trying to use that telemetry data as a key to insert a malicious substantive payload.

In the example of FIG. 4, memory 220 is addressable by n-bits, ranging in address from 0 to $2^n-1$. Within memory 220 is an OS 222, enclave 440, application stack 420, and application code 430.

In this example, enclave 440 is a specially-designated portion of memory 220 that cannot be entered into or exited from except via special instructions, such as Intel® SGX or similar. Enclave 440 is provided as an example of a secure environment which, in conjunction with a secure processing engine 410, forms a trusted execution environment (TEE) 400 on client device 200. A TEE 400 is a combination of hardware, software, and/or memory allocation that provides the ability to securely execute instructions without interference from outside processes, in a verifiable way. By way of example, TEE 400 may include memory enclave 440 or some other protected memory area, and a secure processing engine 410, which includes hardware, software, and instructions for accessing and operating on enclave 440. Non-limiting examples of solutions that either are or that can provide a TEE include Intel® SGX, ARM TrustZone, AMD Platform Security Processor, Kinibi, securiTEE, OP-TEE, TLK, T6, Open TEE, and SierraTEE, CSE, VT-x, MemCore, Canary Island, Docker, and Smack. Thus, it should be noted that in an example, secure processing engine 410 may be a user-mode application that operates via trusted execution framework 226 within enclave 440. TEE 400 may also conceptually include processor instructions that secure processing engine 410 and trusted execution framework 226 require to operate within enclave 440.

Secure processing engine 410 and trusted execution framework 226 may together form a trusted computing base (TCB), which is a set of programs or computational units that are trusted to be secure. Conceptually, it may be advantageous to keep TCB relatively small so that there are fewer attack vectors for malware objects 182 or for negligent software. Thus, for example, operating system 222 may be excluded from TCB, in addition to the regular application stack 420 and application code 430.

In certain systems, computing devices equipped with the Intel Software Guard Extension (SGX) or equivalent instructions may be capable of providing an enclave 440. It should be noted however, that many other examples of TEEs are available, and TEE 400 is provided only as one example thereof. Other secure environments may include, by way of nonlimiting example, a virtual machine, sandbox, testbed, test machine, or other similar device or method for providing a TEE 400.

In an example, enclave 440 provides a protected memory area that cannot be accessed or manipulated by ordinary computer instructions. Enclave 440 is described with particular reference to an Intel® SGX enclave by way of example, but it is intended that enclave 440 encompass any secure processing area with suitable properties, regardless of whether it is called an "enclave."

One feature of an enclave is that once an enclave region 440 of memory 220 is defined, as illustrated, a program pointer cannot enter or exit enclave 440 without the use of special enclave instructions or directives, such as those provided by Intel® SGX architecture. For example, SGX processors provide the ENCLU[EENTER], ENCLU[ERESUME], and ENCLU[EEXIT]. These are the only instructions that may legitimately enter into or exit from enclave 440.

Thus, once enclave 440 is defined in memory 220, a program executing within enclave 440 may be safely verified to not operate outside of its bounds. This security feature means that secure processing engine 410 is verifiably local to enclave 440. Thus, when an untrusted packet provides its content to be rendered with trusted execution framework 226 of enclave 440, the result of the rendering is verified as secure.

Enclave 440 may also digitally sign its output, which provides a verifiable means of ensuring that content has not been tampered with or modified since being rendered by secure processing engine 410. A digital signature provided by enclave 440 is unique to enclave 440 and is unique to the hardware of the device hosting enclave 440.

Figure 5:
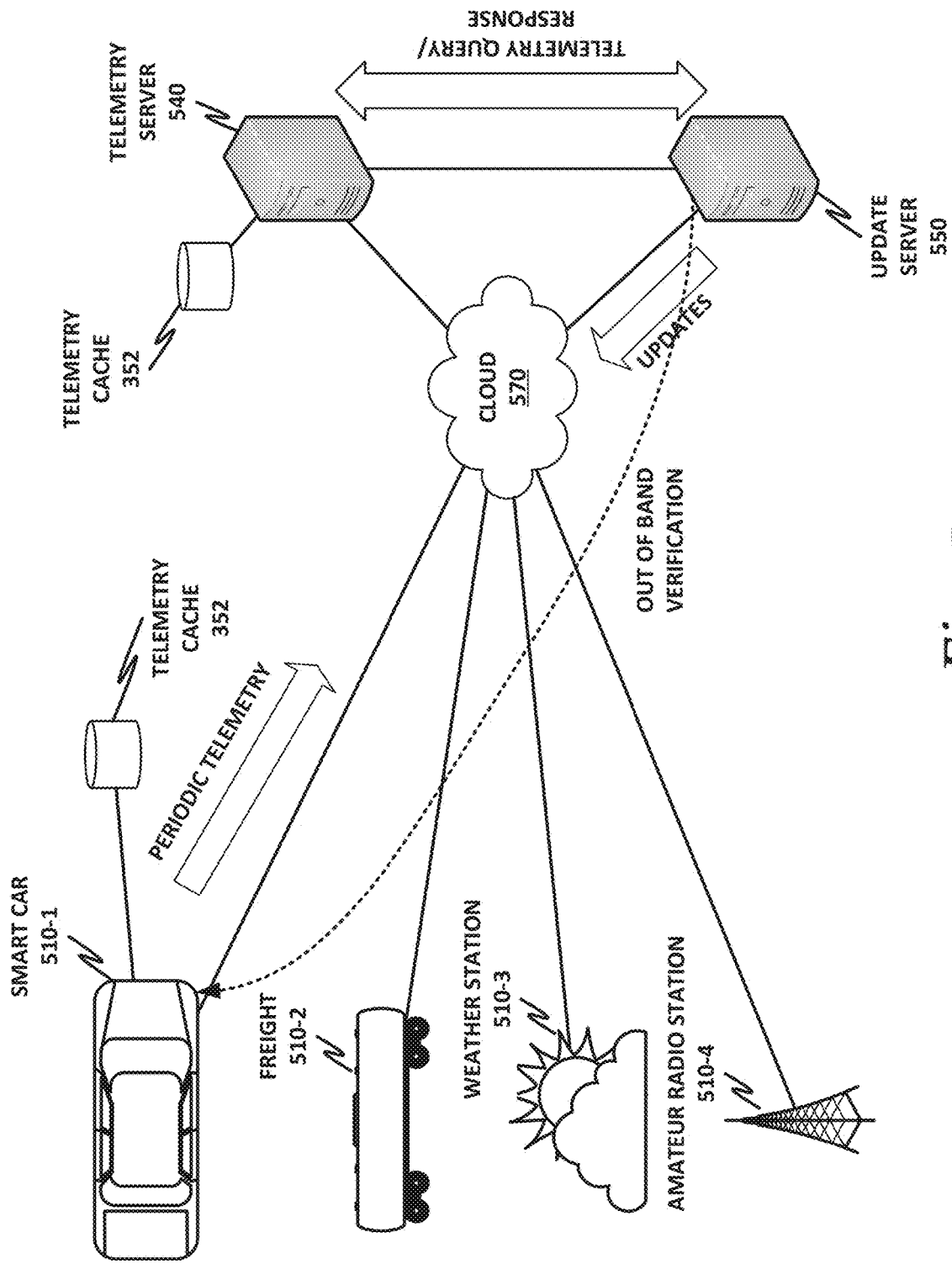
FIG. 5 is a block diagram of a telemetry exchange according to one or more examples of the present specification.

FIG. 5 is a block diagram of a telemetry exchange according to one or more examples of the present specification. In the example of FIG. 5, a plurality of IoT devices are illustrated by way of nonlimiting example. These devices illustrate some types of devices that may be used in an IoT architecture, but are not intended to be an exhaustive list or exclusive of any other devices.

By way of example, each IoT device 510 may be an example of a client device 200 of FIG. 2. In this illustration, four IoT devices 510 are provided. Specifically, smart car 510-1, freight vehicle 510-2, weather station 510-3, and amateur radio ("ham") station 510-4. Each IoT device 510 may include a local telemetry cache 252 as illustrated in FIG. 2. Telemetry cache 252 may include any suitable telemetry or contextual data that may be collected by or provided to IoT device 510. For example, smart car 510-1 may collect any of the data mentioned previously with respect to a vehicle. Freight vehicle 510-2 may collect data such as GPS locations, grows weight, checkpoints passed, operating conditions, or other similar conditions. Weather station 510-3 may collect values such as weather conditions, user inputs, and external data inputs. Amateur radio station 510-4 may collect data such as operating conditions, operating equipment, logged contacts, power readings, signal strengths, or similar.

It should be noted that devices 510 may collect more data than they store, or may be provided with a sampling algorithm to store characteristic data points without keeping an exhaustive record of all data points. Devices 510 may then provide periodic telemetry to a cloud service 570. This may be any suitable service, such as an enterprise server in workload cluster 142 of FIG. 1, a service provider cloud, a manufacturer's cloud, a home server, or any other suitable offsite storage location. Periodic telemetry may include all or a subpart of data stored on local telemetry cache 252.

In this example, periodic telemetry data are provided to telemetry server 540, which in this case is a standalone telemetry data server. This could be, for example, an independent data broker that collects a large number of data from a broad base of devices in a so-called "big data" architecture. However, it should be understood that this example is nonlimiting. In some cases, telemetry server 540 may be a single device with update server 550. It should also be recognized that many different entities could operate one or both of telemetry server 540 and update server 550. Thus, the disclosure herein is provided to illustrate the logical division of function between telemetry server 540 an update server 550, and not to necessarily require a particular physical configuration.

Using smart car 510-1 as an example, smart car 510-1 collects periodic telemetry, and stores telemetry values in local telemetry cache 252. Smart car 510-1 provides some or all of those values as periodic telemetry via cloud 570. These data are then uploaded to telemetry server 540, which stores some or all of the values in telemetry cache 352.

At some point, it may be necessary for smart car 510-1 to authenticates itself to update server 550, or for update server 552 authenticate itself to smart car 510-1. For example, smart car 510-1 may perform a periodic check for available updates by querying update server 550. In that case, to ensure that smart car 510-1 is authentic, update server 550 may request that smart car 510-1 provide the value of a particular data point from local telemetry cache 252. Update server 550 may also query telemetry server 540 for a matching value in telemetry cache 352. Upon comparing the two values and determining that they are the same, update server 550 may deem smart car 510-1 to be authenticated.

On the other side of this transaction, smart car 510-1 may want to authenticate update server 550 before accepting and applying updates. Thus, in an example, when update server 550 prepares an update package for smart car 510-1, update server 550 may prepare both a contextual data packet and a contextual data packet. The contextual data packet may include one or more values retrieved from telemetry cache 352. These may be provided in any suitable format. For example, contextual data may be sent as a separate packet to smart car 510-1. In that case, the verification may be performed out of band. For example, update server 550 may provide a contextual data packet via an out of band service, such as a cellular data connection, while providing the substantive data packet via a traditional IP network.

The contextual data packet may be provided in any suitable form. In one example, the contextual data packet is provided in clear text. In another example, it may be a hash of a telemetry value, so that a man in the middle cannot intercept the packet and view the contextual data. In that case, smart car 510-1 may retrieve a matching element from local telemetry cache 252, and hash the value with the same algorithm, and compare only the hashes. Not only does hashing increase security, but also may be provided to increase user privacy. Indeed, some data values may be stored in telemetry cache 352 only as a hash, to enhance user privacy.

In another example, the contextual data package is encrypted, for example using a pre-shared key. Smart car 510-1 may receive the encrypted packet, and may apply the pre-shared key to decrypt the packet and compare it to a locally stored value in local telemetry cache 252. To further enhance security, update server 550 and or smart car 510-1 may be provided with a unique key, in which case attestation may also be performed, either in-band or out-of-band, between update server 550 and smart car 510-1.

In another example, the substantive data packet is encrypted, and may be decrypted by any of the preceding methods. Alternatively, the hashed or unhashed telemetry value or values may be used as an encryption key, similar to a password in asymmetric encryption. In that case, update server 550 may provide an index or other identifier to smart car 510-1, so that smart car 510-1 can retrieve the appropriate value from local telemetry cache 252, and use the value (or a hash of the value) to decrypt the substantive data packet.

In yet other examples, the contextual data package may be appended as a header or a footer to the substantive data package, and both may be provided as a single packet in-band, via cloud 570. Many other suitable configurations are also possible.

Once smart car 510-1 has authenticated update server 550, it may safely apply the substantive data packet. The act of applying the substantive data packet should be construed broadly to encompass any act of receiving an object in the substantive data packet and using it for its intended purpose. By way of nonlimiting example, this may include updating a file, updating a driver, applying a patch, applying inputs, applying a software update, applying an operating system update, executing a program, or taking any other suitable action.

In various embodiments, freight vehicle 510-2, weather station 510-3, amateur radio station 510-4, or any other suitable client device may engage in a similar method to authenticates itself to update server 550, authenticate update server 550 to itself, or otherwise perform a secured data transaction.

FIG. 6 is a flowchart of a method 600 performed by a server 300 according to one or more examples of the present specification. Server 300 may be a server within workload cluster 142 of FIG. 1, update server 550 of FIG. 5, a telemetry server 540 of FIG. 5, or any other suitable server device.

In block 610, server 300 receives periodic contextual data or telemetry updates from a client device.

In block 620, server 300 stores some or all of the contextual data in a telemetry cache 352. This may include storing encrypted values, clear text values, or hash values. These may also be indexed to identify the device to each packet is associated with, and other data that may be used to locate and identify data packets. When many different devices and classes of devices are used, multiple indices may be used to identify and cross-correlate values.

In block 640, server 300 receives an over the air update request. It should be understood that over the air updates are used as a nonlimiting example, and wired updates are also available, or other non-update interactions.

In block 650, server 300 randomly or pseudo-randomly selects contextual data value pairs for authentication and/or encryption. In an example, random or pseudorandom selection may be used to make it more difficult for a malicious actor to predict which data values will be used. This is helpful if a malicious actor is able to secure a limited set of telemetry values but not all of the telemetry values. In that case, it will be difficult for the malicious actor to know in advance which values will be used in an authentication.

In block 660, server 300 encrypts the update package. This may include encrypting with a pre-shared key, with a key stored in a TEE, or any other suitable encryption method. In an example, a hash of the telemetry value is itself used as an encryption key. In that case, the contextual data packet may simply be an index to identify which data value to retrieve. This allows the client to receive and hash the appropriate telemetry value, and use that as a decryption key for the substantive data package.

In block 670, server 300 may optionally sign the encrypted update package within a TEE 400.

In block 680, server 300 sends the encrypted update package to a client device.

In block 699, the method is done.

FIG. 7 is a flowchart of a method 700 performed by a client device 200 according to one or more examples of the present specification. Client device 200 may include any suitable client, such as client device 110 of FIG. 1, any of the IoT devices 510 of FIG. 5, or any other suitable device.

In block 710, client device 200 polls an update server 300 for available updates. It should be understood that this is provided as a nonlimiting example only, and the authenticated transaction may be initiated for any suitable purpose.

In block 720, client device 200 receives an update package. This may include both a contextual data packet and a substantive data packet. As described previously, the contextual data packet could be provided in-band or out-of-band, and may be a header or a footer to the substantive data packet. Many other suitable configurations are also possible.

In block 740, client 200 extracts contextual data from the update package. This may include decrypting the contextual data, or hashing a value with an algorithm that matches an algorithm used to hash the value on the server. The result of this operation is a value that can be compared with or used with the value provided by the server. This expressly includes the option of retrieving the value, optionally hashing the value, and optionally using the hash value as a decryption key for an encrypted substantive data packet.

In block 750, client 200 compares the extracted contextual data to internally stored contextual data on local telemetry cache 252. This comparing may be an express comparison, such as comparing to values to determine that they match, or it may be an implicit comparison, such as attempting to use the provided value as a decryption key, in which case a successful comparison is that the decryption is successful, and an unsuccessful comparison is that the decryption is unsuccessful.

In decision block 760, client 200 determines whether the values match.

In block 790, if the values do not match, then client 200 may reject the update. In some examples, client 200 may notify a security service, such as a service provided by workload cluster 142 of FIG. 1, or a service provided by security service provider 190 of FIG. 1. Then in block 799, the method is done.

Returning to block 760, if the values do match, then in block 770, client 200 decrypts the substantive data packet.

In block 780, client 200 applies the substantive data packet. As discussed above, applying the substantive data packet may comprise taking any suitable action that uses the substantive packet for its intended purpose.

In block 799, the method is done.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

There is disclosed in one example, a computing apparatus, comprising: a network interface to communicate with a second device; a local contextual data cache; and one or more logic elements comprising a contextual security agent, operable to: receive a contextual data packet via the network interface; compare the contextual data packet to contextual data stored in the local contextual data cache; and act on the comparing.

There is further disclosed an example, wherein the computing apparatus comprises a vehicle computer.

There is further disclosed an example, wherein the contextual data is selected from the group consisting of fuel level, tire air pressure, number of passengers, emissions, location, speed, inside temperature, outside temperature, weather condition, and a logged user input.

There is further disclosed an example, wherein acting on the comparing comprises authenticating the second device at least partly from the contextual data packet.

There is further disclosed an example, wherein comparing the contextual data packet comprises decrypting the contextual data packet.

There is further disclosed an example, wherein acting on the comparing comprises decrypting a substantive data packet.

There is further disclosed an example, wherein decrypting the substantive data packet comprises using all or part of the contextual data packet as a decryption key for the substantive data packet.

There is further disclosed an example, wherein the context engine is further operable to perform a trusted execution environment (TEE) attestation.

There is further disclosed an example, wherein the context engine is further operable to receive a substantive data packet, and wherein acting on the comparing comprises applying the substantive data packet.

There is further disclosed an example, wherein the substantive data packet is a software or firmware update.

There is further disclosed an example, wherein the contextual data packet comprises hashed data, and wherein comparing the contextual data packet to stored data comprises hashing at least part of the stored data.

There is further disclosed an example, wherein the contextual data packet comprises clear-text data.

There is further disclosed an example, wherein receiving the contextual data packet comprises receiving the contextual data packet out of band.

There is further disclosed a server computing device, comprising: a network interface; a contextual data cache interface; and a server engine operable to: receive an update request from a client device via the network interface; receive a contextual datum correlated to the client device via the contextual data cache interface; and provide a substantive data packet and contextual data packet to the client device via the network interface.

There is further disclosed in an example, wherein the server engine is further operable to hash the contextual datum, and to provide a data index to the client device via the network interface.

There is further disclosed an example of one or more tangible, non-transitory computer-readable storage mediums having stored thereon executable instructions for instructing one or more processors for providing a contextual security engine or server engine operable for performing any or all of the operations of the preceding examples.

There is further disclosed an example of a method of providing a contextual security engine or server engine, comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A computing apparatus to control a system, comprising:
    a hardware platform comprising a processor and a network interface;
    a telemetry interface to collect periodic contextual telemetry of the system and transmit the contextual telemetry to a contextual telemetry service via the network interface;
    a local contextual telemetry data cache; and
    a contextual security agent to run on the hardware platform and comprising encoded instructions to:
        receive a push update from an update server via the network interface, the push update for a feature or security update for the apparatus;
        perform out-of-band authentication, comprising:
            selecting a historical telemetry value from the local contextual telemetry data cache;
            operating an out-of-band communication channel to query the update server for the selected historical telemetry value;
            receiving a telemetry value via the out-of-band communication channel;
            determining that the telemetry value received via the out-of-band communication channel matches the selected historical telemetry value; and
        according to the out-of-band authentication, accept the push update.

2. The computing apparatus of claim 1, wherein the computing apparatus comprises a vehicle computer.

3. The computing apparatus of claim 2, wherein historical telemetry data is selected from the group consisting of fuel level, tire air pressure, number of passengers, emissions, location, speed, inside temperature, outside temperature, weather condition, and a logged user input.

4. The computing apparatus of claim 1, wherein performing the out-of-band authentication further comprises decrypting the received telemetry value.

5. The computing apparatus of claim 1, wherein accepting the push update comprises decrypting a substantive data packet.

6. The computing apparatus of claim 5, wherein decrypting the substantive data packet comprises using the received telemetry value as a decryption key for the substantive data packet.

7. The computing apparatus of claim 1, wherein the contextual security agent is further operable to perform a trusted execution environment (TEE) attestation.

8. The computing apparatus of claim 1, wherein the contextual security agent is further operable to receive a substantive data packet, and wherein accepting the push update comprises applying the substantive data packet.

9. The computing apparatus of claim 8, wherein the substantive data packet is a software or firmware update.

10. The computing apparatus of claim 1, wherein the received telemetry value comprises hashed data, and wherein comparing the received telemetry value to the selected historical telemetry value comprises hashing at least part of the local contextual telemetry data cache.

11. The computing apparatus of claim 1, wherein the selected historical telemetry value comprises clear-text data.

12. One or more tangible, non-transitory computer-readable storage mediums having stored thereon executable instructions for providing a contextual security agent configured to:
provide control functions for a controlled system;
receive a push update from an update server via a network interface, the push update for a feature or security update;
perform out-of-band authentication, comprising:
selecting a historical telemetry value from a local contextual telemetry cache, the local telemetry cache comprising telemetry data for the controlled system;
operating an out-of-band communication channel to query the update server for the selected historical telemetry value;
receiving a telemetry value via the out-of-band communication channel;
determining that the telemetry value received via the out-of-band communication channel matches the selected historical telemetry value; and
responsive to the out-of-band authentication, accept the push update.

13. The one or more tangible, computer-readable storage mediums of claim 12, further comprising instructions to compare a contextual telemetry payload of historical telemetry data, including decrypting the historical telemetry data.

14. The one or more tangible, computer-readable storage mediums of claim 12, wherein accepting the push update comprises decrypting a substantive data packet.

15. The one or more tangible, computer-readable storage mediums of claim 14, wherein decrypting the substantive data packet comprises using historical telemetry data as a decryption key for the substantive data packet.

16. The one or more tangible, computer-readable storage mediums of claim 12, wherein the contextual security agent is further operable to perform a trusted execution environment (TEE) attestation.

17. The one or more tangible, computer-readable storage mediums of claim 12, wherein the contextual security agent is further operable to receive a substantive data packet, and wherein accepting the push update comprises applying the substantive data packet.

18. The one or more tangible, computer-readable storage mediums of claim 12, further comprising historical telemetry data including hashed data, and comparing a contextual telemetry payload of the historical telemetry data to a cache of contextual stored telemetry data including hashing at least part of the stored telemetry data.

19. The one or more tangible, computer-readable storage mediums of claim 12, further comprising historical telemetry data including clear-text data.

20. The one or more tangible, computer-readable storage mediums of claim 12, further comprising receiving historical telemetry data out-of-band.

21. A method of authenticating, on a computing device that controls a system, a pushed update from a cloud-based update server, comprising:
periodically reporting historical contextual telemetry to a cloud-based telemetry server, the historical contextual telemetry comprising contextual information about the computing device or a platform or environment in which the computing device operates, and storing copies of the historical contextual telemetry in a local telemetry cache;
receiving, via a network interface, the pushed update from the cloud-based update server;
performing out-of-band authentication, comprising:
selecting a historical telemetry value from the local telemetry cache, the historical telemetry value relating to the controlled system;
operating an out-of-band communication channel to query the cloud-based update server for the selected historical telemetry value;
receiving a telemetry value via the out-of-band communication channel;
determining that the telemetry value received via the out-of-band communication channel matches the selected historical telemetry value; and
according to the out-of-band authentication, accepting the pushed update.

22. The method of claim 21, wherein the historical contextual telemetry is selected from the group consisting of fuel level, tire air pressure, number of passengers, emissions, location, speed, inside temperature, outside temperature, weather condition, and a logged user input.

23. The method of claim 21, wherein the computing device is an on-board computer of a smart car.

24. The method of claim 21, wherein accepting the pushed update comprises decrypting a substantive data packet.

* * * * *

UNITED STATES PATENT AND TRADEMARK OFFICE
CERTIFICATE OF CORRECTION

| | |
|---|---|
| PATENT NO. | : 11,831,654 B2 |
| APPLICATION NO. | : 14/978143 |
| DATED | : November 28, 2023 |
| INVENTOR(S) | : Hinchliffe et al. |

It is certified that error appears in the above-identified patent and that said Letters Patent is hereby corrected as shown below:

In the Drawings

Sheet 4 of 7, in "Fig. 4", for Tag "224", delete "TRUSTED EXECUTION FRAMEWORK" and insert -- Contextual security agent --, therefor.

Sheet 4 of 7, in "Fig. 4", delete "SECURITY AGENT" and insert -- trusted execution framework (TEF) --, therefor.

In the Claims

In Column 23, Claim 13, Line 23, delete "computer-readable" and insert -- non-transitory computer-readable --, therefor.

In Column 23, Claim 14, Line 27, delete "computer-readable" and insert -- non-transitory computer-readable --, therefor.

In Column 23, Claim 15, Line 30, delete "computer-readable" and insert -- non-transitory computer-readable --, therefor.

In Column 23, Claim 16, Line 34, delete "computer-readable" and insert -- non-transitory computer-readable --, therefor.

In Column 23, Claim 17, Line 38, delete "computer-readable" and insert -- non-transitory computer-readable --, therefor.

In Column 23, Claim 18, Line 43, delete "computer-readable" and insert -- non-transitory computer-readable --, therefor.

In Column 24, Claim 19, Line 4, delete "computer-readable" and insert -- non-transitory computer-readable --, therefor.

Signed and Sealed this
Thirtieth Day of January, 2024

*Katherine Kelly Vidal*
Katherine Kelly Vidal
*Director of the United States Patent and Trademark Office*

CERTIFICATE OF CORRECTION (continued)
U.S. Pat. No. 11,831,654 B2

In Column 24, Claim 20, Line 7, delete "computer-readable" and insert -- non-transitory computer-readable --, therefor.